(12) United States Patent
Gill et al.

(10) Patent No.: US 7,496,642 B2
(45) Date of Patent: Feb. 24, 2009

(54) ADAPTIVE VICINITY PREFETCHING FOR FILESYSTEM METADATA

(75) Inventors: Binny Sher Gill, San Jose, CA (US); Leo Shyh-Wei Luan, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 769 days.

(21) Appl. No.: 10/953,243

(22) Filed: Sep. 29, 2004

(65) Prior Publication Data

US 2006/0080401 A1 Apr. 13, 2006

(51) Int. Cl.
G06F 15/16 (2006.01)
(52) U.S. Cl. .................. 709/219; 709/235; 711/118; 711/122; 711/213; 707/1; 707/10; 707/205
(58) Field of Classification Search ............... 709/217, 709/219, 235; 711/118, 122, 213; 707/1, 707/10, 205
See application file for complete search history.

(56) References Cited

U.S. PATENT DOCUMENTS

| | | | |
|---|---|---|---|
| 5,940,841 A | | 8/1999 | Schmuck et al. |
| 6,023,726 A | | 2/2000 | Saksena |
| 6,098,064 A | | 8/2000 | Pirolli et al. |
| 6,240,416 B1 | * | 5/2001 | Immon et al. ............... 707/10 |
| 6,557,079 B1 | | 4/2003 | Mason, Jr. et al. |
| 6,697,808 B1 | * | 2/2004 | Hurwood et al. ............ 707/10 |
| 6,732,124 B1 | * | 5/2004 | Koseki et al. .............. 707/202 |
| 2002/0091763 A1 | | 7/2002 | Shah et al. |
| 2003/0078964 A1 | | 4/2003 | Parrella, Sr. et al. |
| 2003/0105837 A1 | | 6/2003 | Kamen et al. |
| 2003/0120658 A1 | | 6/2003 | Carneal et al. |
| 2003/0120868 A1 | | 6/2003 | Royer, Jr. et al. |
| 2005/0138091 A1 | * | 6/2005 | Bono .......................... 707/205 |
| 2005/0210199 A1 | * | 9/2005 | Dimpsey et al. ............ 711/137 |

OTHER PUBLICATIONS

B. Cahoon et al., "Tolerating latency by prefetching java objects," Workshop on Hardware Support for Objects and Microarchitectures for Java, Austin, TX, Oct. 10, 1999, pp. 1-5.
J. Griffioen et al., "Reducing File System Latency using a Predictive Approach," Technical Report CS247-94,In USENIX Summer, 1994, pp. 197-207.

(Continued)

*Primary Examiner*—William C Vaughn, Jr.
*Assistant Examiner*—Djenane M Bayard
(74) *Attorney, Agent, or Firm*—Joseph P. Curtin, L.L.C.

(57) ABSTRACT

Network latencies are reduced by detecting a metadata access call for filesystem metadata contained in a filesystem node of remotely located filesystem. The metadata corresponding to the metadata access call is fetched when the metadata corresponding to the metadata access call is not contained in a local filesystem cache that has a hierarchical structure corresponding to a hierarchical structure of the remotely located filesystem. Metadata related to the metadata corresponding to the metadata access call from the remotely located filesystem is prefetched when the related metadata is not contained in the local filesystem cache. The metadata related to the metadata corresponding to the access call can be contained in a child node or a parent node of the node containing the metadata corresponding to the access call, or the descendants of such nodes.

1 Claim, 3 DrawingSheets

OTHER PUBLICATIONS

D. Joseph et al., "Prefetching using Markov Predictors," ACM 0-89791-901-7/97/0006, IEEE Transactions on Computers, 48(2):121-133, 1999.

M. Karlsson et al., "A Prefetching Technique for Irregular Accesses to Linked Data Structures," In HPCA, pp. 206-217, 1997.

D. Kotz et al., "Prefetching in file systems for MIMD multiprocessors," IEEE Transactions on Parallel and Distributed Systems, vol. 1, No. 2, Apr. 1990, pp. 218-230.

H. Lei et al, "An Analytical Approach to File Prefetching," In 1997 USENIX Annual Technical Conference, Anaheim, California, USA, 1997.

V.N. Padmanabhan et al., "Using Predictive Prefetching to Improve World Wide Web Latency," In Proceedings of the ACM SIGCOMM '96 Conference, Stanford University, CA, 1996.

R.H. Patterson et al., "Informed Pretching and Caching," In Proceeding of the 15th ACM Symposium on Operating System Principles, Copper Mountain Resort, CO, Dec. 3-6, 1995, pp. 97-95.

A. Roth et al., "Dependence Based Prefetching for Linked Data Structures," ACM SIGPLAN Notices, 33(11):115-126, 1998.

* cited by examiner

ADAPTIVE VICINITY PREFETCHING FOR FILESYSTEM METADATA

BACKGROUND OF THE INVENTION

1. Field of the Invention

The present invention relates to file systems. More particularly, the present invention relates to a method for reducing network latencies observable by a user application.

2. Description of the Related Art

Information sharing has become a critical component of most computer-based systems. As bandwidth is becoming cheaper and networking more ubiquitous, data is being increasingly shared over Wide Area Networks (WANs). A significant problem with sharing data over WANs is the access latency of the shared data. Various approaches have been applied to prefetching file data for reducing cache misses. Unlike file data, though, metadata normally is much smaller in size and prefetching metadata in a LAN setting would not have significant benefits. In a WAN environment, however, prefetching metadata could have significant benefits as long latencies would be hidden from user applications that access metadata. Typically, search programs, interactive user sessions, and other applications that provide a browsing interface to a filesystem would want to access a reasonable amount of filesystem metadata and would significantly benefit from metadata caching. Although speculatively prefetching files over a WAN could sometimes prove more expensive than useful, that possibility is not discounted. Metadata on the other hand is less expensive to prefetch.

Prefetching is an age-old concept. In computer science, prefetching has been used for virtual memory paging, prefetching of files and database objects. Prefetching has also been used on Multiple Instruction Multiple Data (MIMD) architectures to improve parallel file access and even for prefetching Java objects. For improved parallel file access for MIMD architectures, see, for example, C. S. Ellis et al., "Prefetching in file systems for MIMD multiprocessors," Proceedings of the 1989 International Conference on Parallel Processing," St. Charles, Ill., Pennsylvania State Univ. Press, pp. I:306-314, 1989. For prefetching Java objects, see, for example, B. Cahoon et al., "Tolerating latency by prefetching Java objects," Workshop on Hardware Support for Objects and Microarchitectures for Java, Austin, Tex., October 1999.

Prefetching techniques have also been applied to linked data structures, which bear some resemblance in structure to filesystem hierarchies. See, for example, M. Karlsson et al., "A prefetching technique for irregular accesses to linked data structures," HPCA, pp. 206-217, 2000; A. Roth et al., "Dependence based prefetching for linked data structures," ACM SIGPLAN Notices, 33(11), pp. 115-126, 1998; and D. Joseph et al., "Prefetching using markov predictors," IEEE Transactions on Computers, 48(2), pp. 121-133, 1999. Sequential readahead is a simple form of prefetching within a file. There are prefetching techniques, such as the informed prefetching and caching technique, that require hints from an application to do prefetching. See, for example, R. Hugo Patterson et al., "Informed prefetching and caching," In "High Performance Mass Storage and Parallel I/O: Technologies and Applications," edited by Hai Jin et al., IEEE Computer Society Press and Wiley, New York, N.Y., pp. 224-244, 1995.

There are a few instances of work based on probabilistic methods for prefetching files based on past accesses. See, for example, J. Griffioen et al., "Reducing file system latency using a predictive approach," in *USENIX Summer*, pp. 197-207, 1994. H. Lei et al., "An analytical approach to file prefetching," in 1997 USENIX Annual Technical Conference, Anaheim, Calif., USA, 1997, discloses a file prefetching mechanism that is based on on-line analytic modeling of file accesses to capture intrinsic correlations between the accesses. The file usage patterns are later used to heuristically prefetch files from a file server. Predictive prefetching has also been used to improve latencies in World Wide Web (WWW). See, for example, V. N. Padmanabhan et al., "Using predictive prefetching to improve World-Wide Web latency," Proceedings of the ACM SIGCOMM '96 Conference, Stanford University, CA, 1996. In this case, the clients do prefetching based on hints from a server that has seen similar accesses from other clients.

In all the work in the area of prefetching in filesystems, little has been done about prefetching metadata because metadata is usually a small fraction of the size of the file system and needs to be revalidated from time to time anyway. In WAN environments, however, even accessing metadata can become a significant bottleneck. Metadata that has been recently prefetched is considered good enough by most applications that work on remote files. While WAN latencies cannot be remedied, the steadily increasing WAN bandwidth can be leveraged to aggressively prefetch metadata that is likely to be requested by the applications soon.

Consequently, what is needed is a technique that prefetches filesystem metadata to reduce the latency over a WAN.

BRIEF SUMMARY OF THE INVENTION

The present invention provides a technique that prefetches filesystem metadata to reduce network latencies over a WAN.

The advantages of the present invention are provided by a method for reducing network latencies in which a metadata access call for filesystem metadata contained in a filesystem node of remotely located filesystem is detected. The metadata corresponding to the metadata access call is fetched when the metadata corresponding to the metadata access call is not contained in a local filesystem cache. The local filesystem cache has a hierarchical structure corresponding to a hierarchical structure of the remotely located filesystem. Metadata related to the metadata corresponding to the metadata access call from the remotely located filesystem is prefetched when the related metadata is not contained in the local filesystem cache. The metadata related to the metadata corresponding to the access call can be contained in a child node of the node containing the metadata corresponding to the access call. Additionally or alternatively, the metadata related to the metadata corresponding to the access call can be contained in a parent node of the node containing the metadata corresponding to the access call. Alternatively or additionally, the metadata corresponding to the metadata access call and the metadata related to the metadata corresponding to the metadata access call are prefetched when a last time the metadata was fetched exceeds a predetermined amount of time.

A placeholder node is created in the local filesystem cache for each child node of the filesystem node of remotely located filesystem that is a directory when a corresponding node or a placeholder node does not exist in the local filesystem cache for a child node. A work item is generated corresponding to each detected metadata access call, and a pool of worker threads is maintained such that at least one worker thread prefetches metadata related to the metadata corresponding to a work item from the remotely located filesystem when the related metadata is not contained in the local filesystem cache. The metadata corresponding to the metadata access call and metadata related to the metadata corresponding to the metadata access call are prefetched by a plurality of worker threads operating in parallel. A work item contains information relating to a path for the node containing the metadata corresponding to the metadata access call and a predetermined depth to which the prefetch is performed. Metadata related to the metadata corresponding to the work item is prefetched to the predetermined depth below the node containing the metadata corresponding to the metadata access call.

The present invention also detects recursion of a node of the remotely located filesystem. In particular, recursion is detected when the recursion is an unbounded depth-first search, a depth-first search that has a bounded depth to search, a breadth-first search with unbounded depth, or a bounded-depth breadth-first search. Additionally, the recursion is detected when the recursion is a premature termination of an unbounded depth-first search, a premature termination of a depth-first search that has a bounded depth to search, a premature termination of a breadth-first search with unbounded depth, or a premature termination of a bounded-depth breadth-first search. Recursion detection includes determining whether a metadata access for the node has occurred within a predetermined amount of time since a last metadata access for the node. Moreover, recursion detection includes determining whether a predetermined amount of children of the node have been accessed within a predetermined amount of time since a last metadata access for the node occurred.

When recursion of a node is not expected, prefetching the metadata related to the metadata corresponding to the metadata access call is performed to a first predetermined depth below the node containing the metadata corresponding to the metadata access call. Alternatively, when recursion of a node is expected, prefetching the metadata related to the metadata corresponding to the metadata access call is performed to a second predetermined depth below the node containing the metadata corresponding to the metadata access call, the second predetermined depth being greater than the first predetermined depth.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The present invention provides a technique that prefetches and minimizes the effect of WAN latency on application performance by prefetching the metadata of the directories that are close in a filesystem hierarchy to the directories that are accessed because once a directory has been accessed, the children, siblings and other neighboring directories of the accessed directory have a high probability of soon being accessed. The present invention detects various common forms of recursion and adaptively performs more aggressive prefetching in those particular cases. The present invention also records directories that were previously prefetched, but were not used, and avoids prefetching those directories again in the near future. The present invention imposes a slight increase on bandwidth requirements, but reduces the effect of network latency for most metadata access patterns. Thus, combining any of the known file prefetching techniques with the metadata prefetching technique of the present invention, the visibility of WAN latencies to user application can be significantly reduced.

The present invention conceals the effects of metadata access latency at the expense of consuming some extra network bandwidth for the purpose of prefetching metadata. Each filesystem protocol defines a set of calls for access to metadata and the present invention works with any of the metadata access calls. For example, consider the common call readdir. Note that the readdir call applies only to directories. In a situation in which an access call is applicable to both files and directories, the present invention uses the parent directory of the target and applies the techniques metadata prefetching according to the present invention.

The present invention requires that either the filesystem client be directly modified, or a filter or an interceptor be installed. Whenever a metadata access call is started or completes with results, the present invention must be informed. Such calls are very low overhead calls and the majority of the work of the prefetching is done by a pool of worker threads or processes. The worker threads or processes generate prefetch requests to the filesystem with appropriate credentials and populate a local filesystem cache, thus making the data available to the user applications.

The basic mechanism of the present invention is prefetching the metadata in the vicinity of actual accesses to filesystem metadata. Whenever a directory is accessed (i.e., a readdir call is made), the pool of worker threads is given the task of prefetching the subtree rooted at that node up to a depth D, which is determined dynamically. For now, consider depth D to be a small fixed number, such as 2. Later, it will be shown that depth D can be dynamically changed for achieving better prefetching performance. Thus, every directory access triggers a prefetch for a small subtree rooted at that node. A stack of work items is maintained and the worker threads serve the work items collectively and perform the subtree prefetches on the given nodes. More recent work items are given higher priority by the worker threads. The work items that are older than a predetermined age are automatically deleted. A work item contains information about (1) the path of the node based on which the prefetch is to be done; (2) and the depth to which the prefetch has to be done. The accessed node is considered to be at depth 0. During the prefetch, metadata access calls are done on the subdirectories in a way that both directory entries and file attributes are obtained. In some filesystems, a single type of access call can be used to achieve this. In other filesystems, multiple types of calls would be used to prefetch all the metadata information required.

The worker threads work in parallel on possibly overlapping regions of the filesystem hierarchy. For example, one worker thread could be prefetching a subtree of depth D=2 on the node/a/b, while another worker thread could be prefetching a node of depth D=2 on the node/a/b/c. Even though access from the local cache is cheap, various strategies are employed by the present invention for reducing the amount of duplicate prefetching work between worker threads.

A stack data structure is used to maintain the work items. Any data structure that can represent a hierarchy of nodes efficiently can be used for keeping the state of prefetching work items. Each node in the data structure includes the following fields:

Name, which is defined as the name of the node (directory name);

FetchTime, which is defined as the last time this node was prefetched or accessed;

PrefetchDepth, which is defined as the depth that a worker thread has committed to prefetch under this node;

ExpectedRD, which is defined as the depth of recursion expected at this node;

DetectedRD, which is defined as the depth of recursion detected based on accesses under this node;

DRDUpdateTime, which is defined as the last time the DetectedRD was updated in this node;

RecursionType, which is defined as the type of recursion (i.e., Unbounded(0) or Bounded(1));

RecursionWindow, which is defined as the amount of time for which the algorithm remembers detected recursion; and RevalidationTime, which is defined as the amount of time for which fetched metadata is considered valid and need not be revalidated or fetched again.

A node is said to be accessed when a user application invokes the readdir call on the directory. Other types of calls that access metadata can also cause a node to be accessed. Different filesystems have different metadata calls. For clarity, only the common readdir call will be used to describe the present invention. If the readdir call was due to prefetching done by the worker threads, then the node is said to be prefetched, but not yet accessed. Whenever a directory is accessed or prefetched, the node corresponding to the directory is located in the local filesystem cache and corresponding fields of the state data structure are populated. A node in the local filesystem cache is normally created when the parent of the node is prefetched or accessed. The state data fields corresponding to a node are, however, mainly populated when the node itself is prefetched or accessed. If the node does not already exist, the node is first created in the local filesystem cache. Whenever a node is created, the node is initialized with the appropriate name of the directory the node represents. All other fields are set to 0.

Prefetching helps in both first time accesses to a hierarchy and in revalidation in the local filesystem cache hierarchy. RevalidationTime is defined as the amount of time for which fetched metadata is considered valid and need not be revalidated or fetched again. The value chosen for the amount of time fetched metadata is considered valid depends on the user applications as well as the semantics of the filesystem in use. Thus, whenever a worker thread has the task of prefetching a node, the worker thread first checks the corresponding state data for determining whether the node was recently fetched. When the node does not need revalidation, then the worker thread does not perform the prefetch. If the node was never fetched or needs to be revalidated, then the node is prefetched and the FetchTime for the node is set to the current time. Additionally, when the prefetch was due to a work item based on that node, the PrefetchDepth is set to the depth indicated in the work item. Otherwise, the PrefetchDepth is set to max(0, parent's PrefetchDepth−1). Placeholder nodes are then created for all the children of the node that are directories. The Name is set appropriately in all those nodes and all of the other fields are set to 0.

The worker threads work in parallel and populate the local filesystem cache and corresponding state data fields simultaneously. To minimize duplicate work among various worker threads, the following five strategies are employed:

(1) A new work item is not added when a work item already exists in the work-item stack that covers the subtree to be prefetched.

(2) A work item is replaced in the work-item stack with a new work item when the new work item completely covers the old work item. Such a situation could happen when a new work item is based at the same node with the same or greater PrefetchDepth, or when a new work item is based at an ancestor of the old node with a PrefetchDepth that would subsume the old subtree completely.

(3) When a node has a FetchTime that is not more than RevalidationTime in the past, then the node is not prefetched.

(4) Each node stores the depth below the node (PrefetchDepth) that will also be prefetched by the same work item that prefetched the node. When a worker thread must prefetch a node, the worker thread checks the PrefetchDepth on the node. If the PrefetchDepth is equal or greater than the depth that the worker thread intends to prefetch, and the FetchTime on the node is not more than RevalidationTime in the past, then nothing needs to be done for both that node and the subtree under the node.

(5) To decrease the amount of repeated work, a worker thread uses breadth-first recursion on their subtrees. Breadth-first recursion on subtrees causes worker threads to spend more time on the higher levels of the hierarchy before prefetching the nodes lower in the hierarchy. Consequently, a worker thread that is based on a lower node in the hierarchy has an opportunity to catch up with an earlier worker thread based on a higher node, thereby avoiding duplicate work.

The present invention detects common forms of recursion in filesystems. For example, common forms of recursion that can be started from any given node include an unbounded depth-first search; a depth-first search that has a bounded depth to search; a breadth-first search with unbounded depth; and a bounded-depth breadth-first search. Another common form of recursion that the present invention detects includes premature termination by user intervention or program behavior of any of the four previously mentioned common forms of recursion. Yet another form of recursion detectable by the present invention includes, during a depth-first search, reaccess of a parent node to find the next child or all children may be accessed at once requiring only one access to the parent node. In all of the detectable forms of recursion, the order within each directory can be time-ordered, reverse time-ordered, alphabetic or reverse alphabetic, or filesystem server listing-ordered (which is mostly fixed, but not necessarily in any particular order).

To detect such a large variety of recursions, the path of the directory and the list of children are reported to the present invention whenever a user application invokes a metadata access call of interest (i.e., the readdir call). Subdirectories are only counted as children. Whenever a directory is accessed by a user application, the Fetchtime is updated. When the node has not yet been created in the cache, the corresponding node is created in the local filesystem cache and the Fetchtime for the node is set to the current time. RecursionWindow is defined as the amount of time for which the algorithm remembers detected recursion. Thus, a node having a DRDUpdateTime that is more than RecursionWindow time in the past is not considered for detecting or anticipating recursion. Any node that has a DRDUpdateTime within the RecursionWindow amount of time in the past is said to be fresh. The DetectedRD is reset to 0 for any node having a DRDUpdateTime more than the RecursionWindow time after its last DRDUpdateTime. Additionally, the DRDUpdateTime for the node is set to the current time.

The RecursionType is also set appropriately based on the presence of subdirectories under the accessed node. Two more quantities are defined as follows:

$U_{max}$ at a node is defined to be the maximum DetectedRD among all the fresh siblings of the node that are of Unbounded RecursionType. When there is no such sibling, $U_{max}$ is set to 0.

$B_{min}$ at a node is defined to be the minimum DetectedRD among all the fresh siblings of the node that are of Bounded RecursionType. When there is no such sibling, $B_{min}$ is set to a value representing infinity.

Whenever most children of the parent of a node have been recently accessed, the following fields are calculated for the node being accessed:

```
if (B_min == infinity)
    if (this node is fresh)
        DetectedRD = max(U_max, this node's DetectedRD) + 1;
    RecursionType = Unbounded;
    else
        DetectedRD = U_max + 1; RecursionType = Unbounded;
else
    DetectedRD = B_min + 1; RecursionType = Bounded;
```

When either DetectedRD or RecursionType are different from the current values in the parent node, or when the parent node is not fresh, then the DetectedRD and RecursionType fields, along with DRDUpdateTime, are updated in the parent node. When the parent node was updated, then the same calculations are done on the parent node and the grandparent node is updated, if required. The changes in DetectedRD and RecursionType are, thus, percolated upwards in the hierarchy until there is no resulting change in the fields of an ancestor.

Thus, at each node, the depth to which recursion has been recently performed is maintained and whether the recursion is bounded or unbounded in nature. Recursion detection works for both depth-first and breadth-first. As mentioned earlier, all children of a directory are not required to be recently accessed before the directory is considered to be completely accessed. All that is required is that "most" of the children subdirectories be recently accessed. "Most" can be defined as a configurable percentage of the total number of children, thereby avoiding missing out on recursions simply because of application-level caching of metadata, or the concurrent creation of new subdirectories, or even a smaller than optimal RecursionWindow.

In order to provide a more aggressive prefetching in cases in which recursion is detected and to provide less prefetching in other cases to minimize unwanted prefetches while still performing aggressive prefetching when possible, two values are defined for the depth of a prefetch. One depth value is the minimum depth of recursion $D_{min}$. The other depth value is a maximum depth of recursion $D_{max}$. A value of 1 is initially selected for $D_{min}$ and a value of 3 is chosen for $D_{max}$. When no recursion is expected, then the prefetch done on a node on an access is up to a depth of $D_{min}$. When recursion is expected, then the prefetch depth is done up to a depth of $D_{max}$ for more aggressive prefetching.

A node is created in the local filesystem cache when its parent is accessed or prefetched. At that time, the names of the children are known and placeholder nodes are created in the local filesystem cache for each subdirectory. A placeholder node is created with the Name field set to the name of the child directory and all other fields of the placeholder node set to 0. When a node is accessed (or prefetched) and some of the ancestors of the node are not present in the local filesystem cache hierarchy, then the ancestors are created one by one, assuming that they were also accessed (or prefetched) in that order.

When a worker thread has the job of prefetching a given node, the worker thread first checks whether the node in the local filesystem cache has a corresponding non-zero FetchTime field. When the FetchTime is less than RevalidationTime in the past, the node need not be prefetched. In other cases, the node is prefetched and placeholder nodes are created in the data structure for the new children. The old children no longer in the listing are recursively deleted. Further, when a node being prefetched, the FetchTime is set to the current time and the PrefetchDepth is set to max(0, parent's PrefetchDepth−1). When the prefetch was because of a work item based on that node, the PrefetchDepth is set to the depth indicated in the work item instead. Thus, each prefetched node stores the depth that the worker thread that prefetched it intends to prefetch under it, thereby minimizing duplicate work among threads.

Figure 1A:
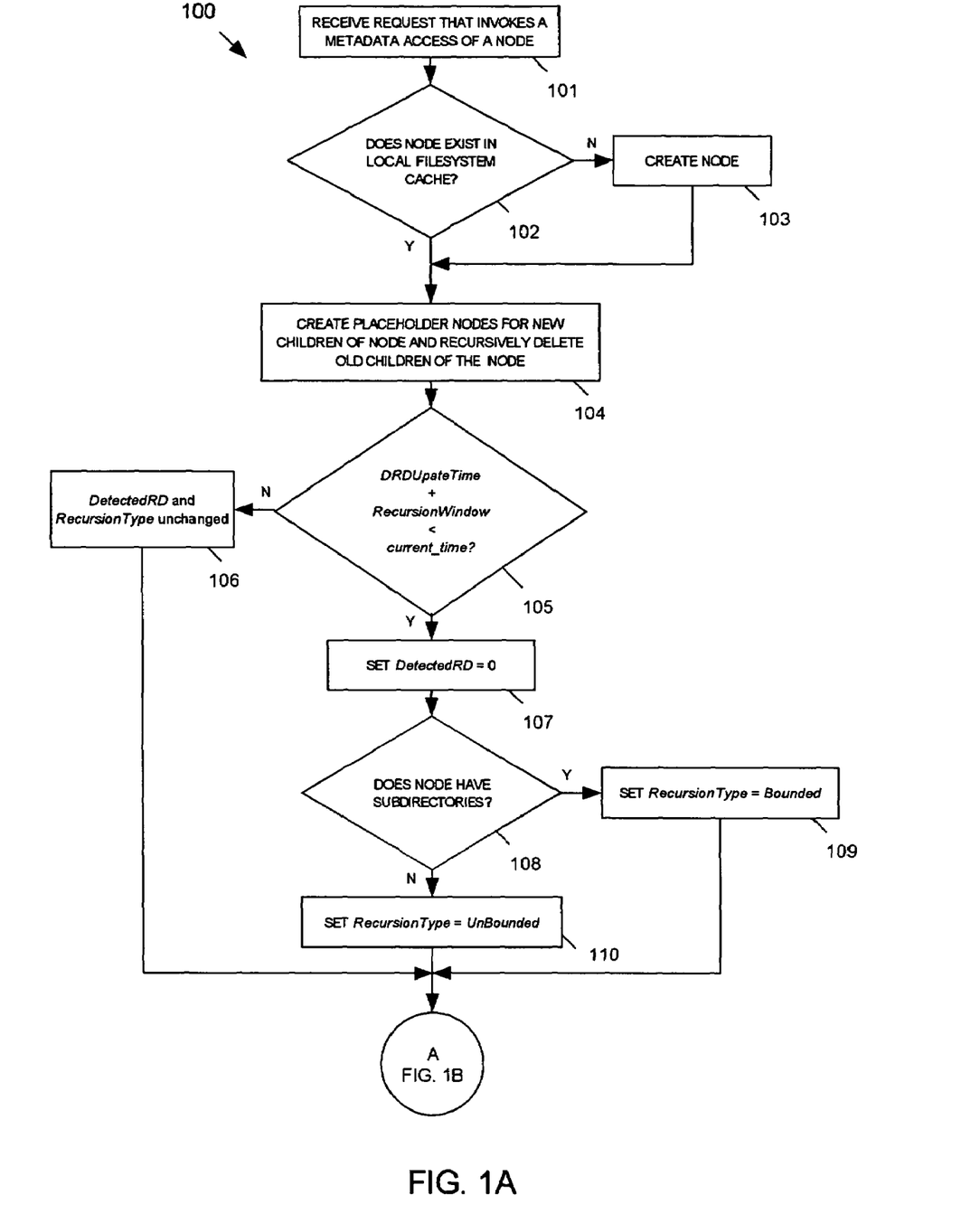
FIGS. 1A-1C are a flowchart depicting a method for prefetching metadata of directories in a filesystem hierarchy according to the present invention.
Figure 1B:
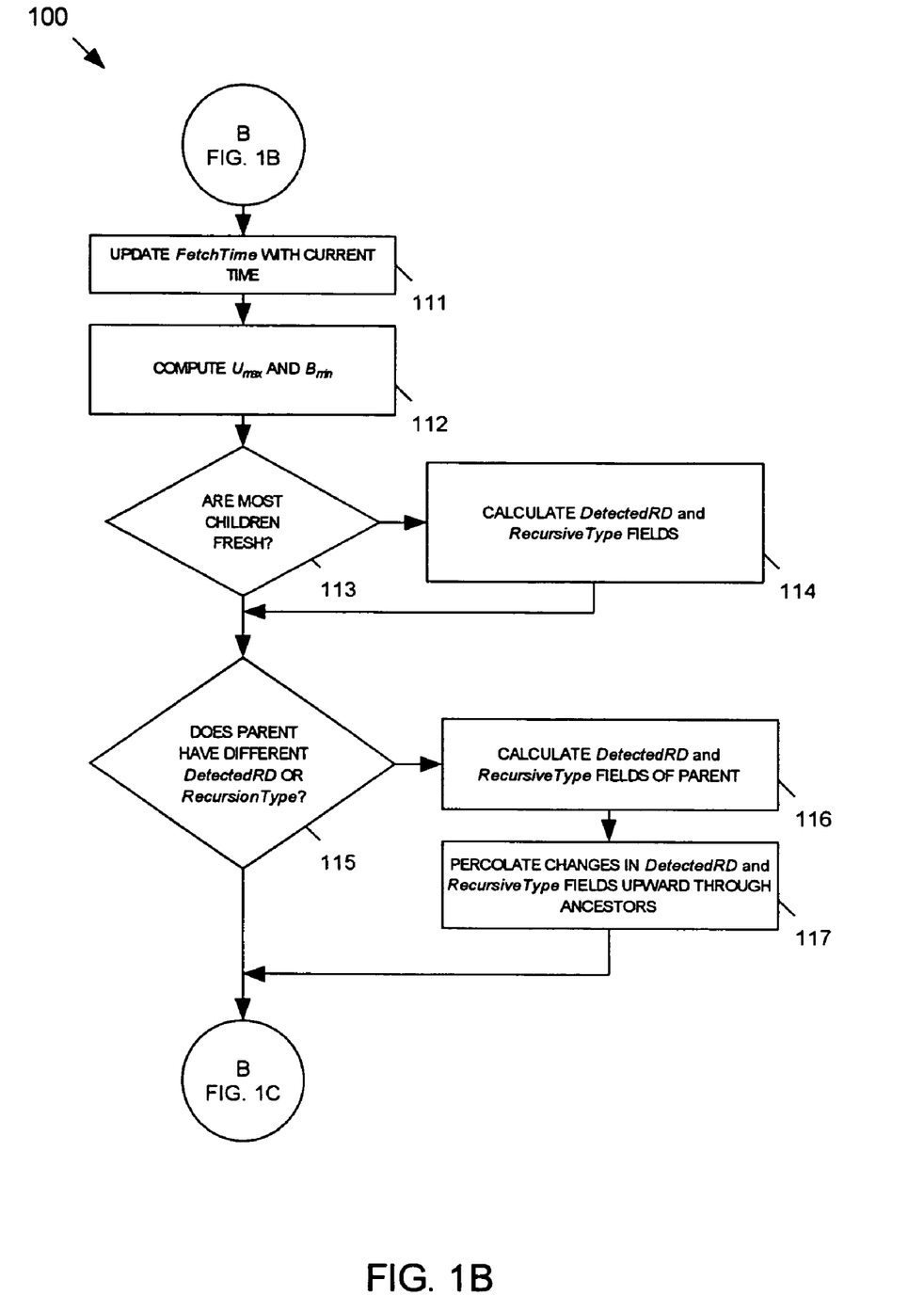
Figure 1C:
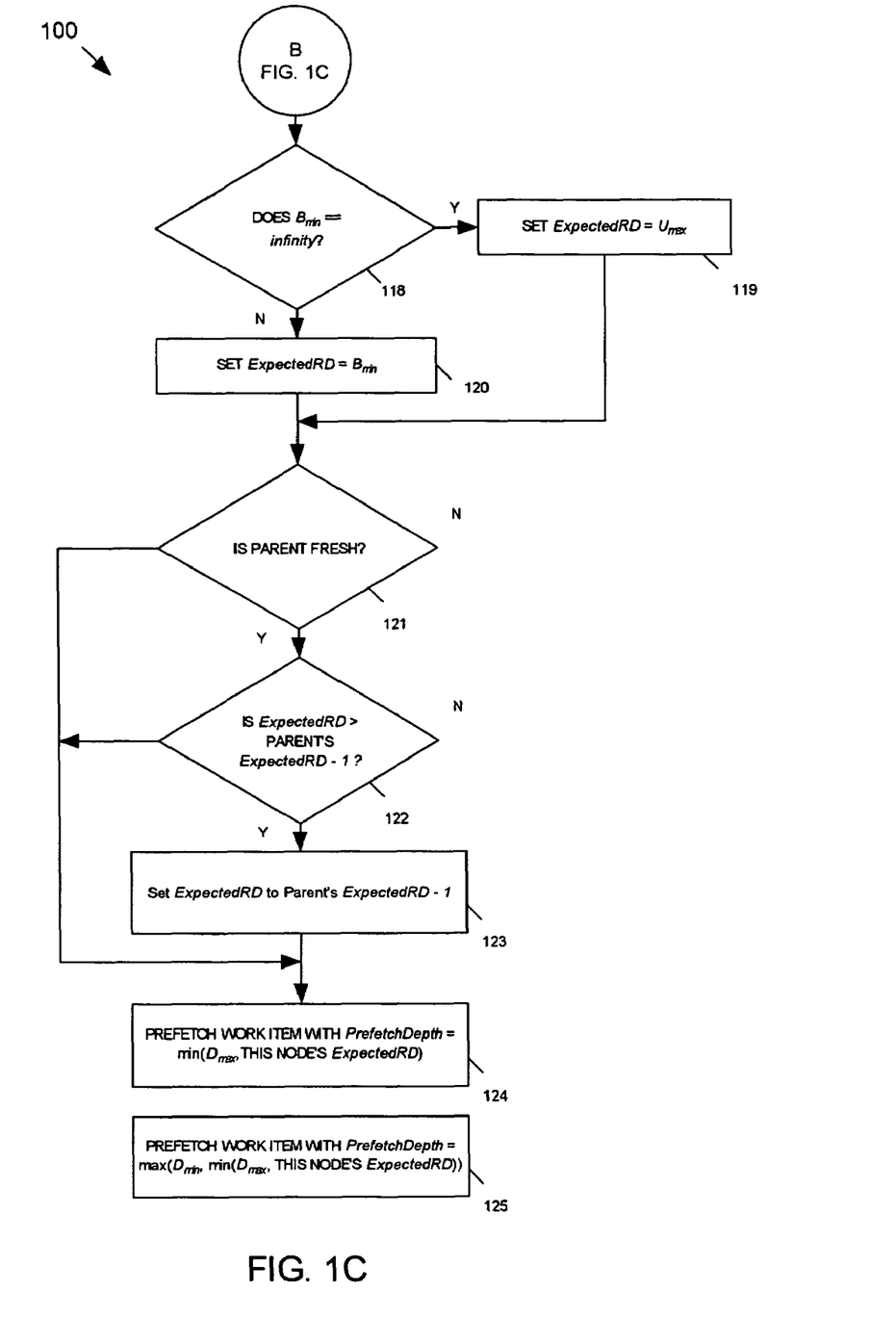

FIGS. 1A-1C are a flow diagram depicting a metadata prefetching technique according to the present invention. At step 101, a request is received that invokes a metadata access of a node. Flow continues to step 102 where it is determined whether the node exists in the local filesystem cache. If, at step 102, it is determined that no node exists in the local file system cache, flow continues to step 103 where a node corresponding to the accessed node is created in the local filesystem cache. Flow continues to step 104. If, at step 102, it is determined that a node corresponding to the accessed node exists in the local filesystem cache, flow continues to step 104.

At step 104, placeholder nodes are created in the local filesystem cache for new children and old children no longer in the directory listing are recursively deleted. Flow continues to step 105 where it is determined whether the DRDUpdateTime for the node is more than RecursionWindow time in the past for the node. If the node is fresh, flow continues to step 106, where DetectedRD and RecursionType fields for the node are left unchanged. Flow continues to step 111 (FIG. 1B). If, at step 105, the node is not fresh, flow continues to step 107 where DetectedRD is set to 0, thereby updating DRDUpdateTime to the current time.

Flow continues to step 108 where it is determined whether the node has subdirectories. If so, flow continues to step 109 where RecursionType is set to Bounded and then flow continues to step 111 (FIG. 1B). If, at step 108, it is determined that the node does not have subdirectories, RecursionType is set to Unbounded, and flow continues to step 111 (FIG. 1B).

At step 111 (FIG. 1B), FetchTime is updated with the current time. Flow continues to step 112 where $U_{max}$ and $B_{min}$ are computed. Flow continues to step 113 where it is determined whether most of the children of the parent are fresh. If so, flow continues to step 114, where DetectedRD and RecursionType fields are calculated as follows before flow continues to step 115.

```
if (B_min == infinity)
    if (this node is fresh)
        DetectedRD = max(U_max, this node's DetectedRD) + 1;
    RecursionType = Unbounded;
    else
        DetectedRD = U_max + 1; RecursionType = Unbounded;
else
    DetectedRD = B_min + 1; RecursionType = Bounded;
```

If, at step 113, it is determined that most of the children of the parent are not fresh, flow continues to step 115 where it is determined whether the parent has a different DetectedRD or RecursionType. If so, flow continues to step 116 where DetectedRD and RecursionType for the parent is calculated and updated. Flow continues to step 117 where the changes in DetectedRD and RecursionType are percolated upwards in the hierarchy until there is no resulting change in the fields of an ancestor. Flow continues to step 118 (FIG. 1C). If, at step 115, it is determined that the parent has the same DetectedRD and RecursionType, flow continues to step 118 (FIG. 1C).

At step 118, it is determined whether $B_{min}$=infinity. If so, flow continues to step 119 where ExpectedRD is set equal to $U_{max}$. Flow then continues to step 121. If, at step 118, it is determined that $B_{min} \neq$ infinity, the flow continues to step 120 where ExpectedRD is set equal to $B_{min}$. At step 121, it is determined whether the parent is fresh. If not, flow continues to step 124. If so, flow continues to step 122 where it is determined whether the ExpectedRD of the node is greater than the (ExpectedRD of the parent−1). If not, flow continues to step 124. If so, flow continues to step 123 where ExpectedRD of the node is set equal to the (ExpectedRD−1). Flow continues to step 124.

At step 124, prefetch work items are then run with a PrefetchDepth equal to min($D_{max}$, this node's ExpectedRD) on all the siblings. A prefetch work item is also run with a PrefetchDepth set equal to max($D_{min}$, min($D_{max}$, this nodes' ExpectedRD)) on this node. It is important to note that the prefetch work items need not be done when the same prefetch was recently done (i.e., the FetchTime is within RevalidationTime).

To further understand the metadata prefetching technique of the present invention, consider the following. In a new node, the DetectedRD field is always set to 0. The RecursionType is set to Unbounded when the node has no subdirectories. Otherwise, the node is marked as Bounded when the node has subdirectories. Whenever a node is accessed and "most" of its siblings are fresh, the DetectedRD is recomputed for the parent node. When there is any sibling that is of RecursionType bounded, then it is known that the recursion is not an unbounded depth-first recursion. In this case, the lowest Bounded DetectedRD among the fresh siblings is selected and the RecursionType is assumed to be bounded. Other nodes could have a higher Bounded DetectedRD because of concurrent accesses that are not part of the recursion that has been detected. The node is not considered to be accessed for computing the minimum as the minimum could falsely indicate a minimum bounded recursion depth of 0. Because the node was just accessed, the application is assumed to access the nodes under the node, as well. When all the recently accessed siblings are unbounded in nature, then it could be a case of either unbounded recursion, or a bounded recursion with a depth more than the depth of any of the subtrees under the siblings. In this case, the recursion is treated as unbounded and the maximum unbounded DetectedRD is reported to the parent. The node is considered to be accessed for computing the maximum. When the node is accessed for the first time, then the node will have a DetectedRD of 0 and would have no effect on the maximum. When the node was accessed earlier and has the maximum DetectedRD among the recently accessed siblings and was accessed again (for example, by another application), then the DetectedRD should not be brought down falsely by not considering this node. Thus, the node is itself considered in this case.

When a node is not fresh, the DetectedRD value for the node is not used. When the DetectedRD is not updated for a long time (RecursionWindow), the DetectedRD is reset to 0, the DRDUpdateTime is set to the current time and the RecursionType is also set according to the presence of subdirectories. The DetectedRD value is not used in nodes that are not fresh because the calculation of ExpectedRD should not be based on recursions that were detected long back as those recursions could be long finished or aborted.

The ExpectedRD field is always set when a node is accessed. The ExpectedRD field is only used in calculating the depth of recursion that is to be expected on all the siblings of a node. When a node is the only fresh node under its parent, then any recursions are not expected under its siblings, unless of course when the parent is fresh and has an ExpectedRD greater than 1. When there are other fresh nodes under the parent, then the ExpectedRD field is calculated based on the depths and types of those detected recursions and the ExpectedRD in the parent, if fresh. Prefetch work items are then started when the expected recursion depth is greater than 0. In the work items, the depth to prefetch is set to the minimum of $D_{max}$ and the ExpectedRD calculated, as described above. On the node itself, a prefetch work item is run with the same prefetch depth, but when the prefetch depth thus calculated is less than $D_{min}$ then a prefetch of depth $D_{min}$ is run. The ExpectedRD field is stored in a node so that it can easily be accessed when a child is accessed and needs to refer to the ExpectedRD field of the parent.

For Breadth-first recursion, the present invention prefetches a minimum depth of $D_{min}$ (with $D_{min}$=1) under each accessed node. Thus, while nodes in a particular level are being accessed, the nodes in the next level are being prefetched. So, both bounded and unbounded breadth-first recursions are effectively prefetched. When $D_{min}$ is greater than 1, prefetching would be more aggressive.

For Depth-first recursion, each node is aware of the depth under it that has been accessed. Whenever a node is accessed, the node is expected to be accessed in a way that is similar to the way its siblings were accessed. A node also gets hints from the parent node about the expected depth of recursion. Thus, prefetching is performed on the accessed node and the siblings based on the access depths in nodes that have already been accessed. Both bounded and unbounded depth-first recursions benefit from such prefetching. In unbounded recursion, prefetching should be avoided too deeply below the sibling's nodes because the recursion could be prematurely stopped by a user or as a false detection of recursion. Thus, the maximum depth of prefetching is limited to $D_{max}$, while ExpectedRD is still not bounded in any way. Depending on the behavior of applications, $D_{max}$ can be tuned accordingly.

Any reasonable implementation should impose an upper bound on the amount of memory that can be used by the representation of the data structure hierarchy. Thus, the data structure hierarchy could be pruned based on the last access times on the nodes, removing leaves of the tree according to a Least Recently Used (LRU) algorithm. This also exposes the present invention to cases in which an application can access a node that is not a direct child of any node in the data structure hierarchy. In such cases, the required intermediate nodes in the data structure hierarchy would be created and pull in the number of children and names of siblings in the nodes, as and when, needed by the present invention.

Thus far, the description of the present invention has focused primarily read-type access calls. In the presence of write-type access calls, the present invention must be informed about the write calls so that the present invention can quickly invalidate or revalidate the effected nodes in the data structure hierarchy. Even when the data structure hierarchy is out of date, the correctness of any application will not be affected because the data structure hierarchy is only used to direct prefetches and not the real data accesses.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for reducing network latencies, comprising:

detecting a metadata access call for filesystem metadata contained in a filesystem node of remotely located filesystem;

fetching the metadata corresponding to the metadata access call when the metadata corresponding to the metadata access call is not contained in a local filesystem cache, the local filesystem cache having a hierarchical structure corresponding to a hierarchical structure of the remotely located filesystem detecting recursion of a node of the remotely located filesystem; and prefetching metadata related to the metadata corresponding to the metadata access call from the remotely located filesystem when the related metadata is not contained in the local filesystem cache wherein when recursion of a current node is not expected, prefetching the metadata related to the metadata corresponding to the metadata access call is performed to a first predetermined depth below the node containing the metadata corresponding to the metadata access call, and wherein when recursion of a current node is expected, prefetching the metadata related to the metadata corresponding to the metadata access call is performed to a second predetermined depth below the node containing the metadata corresponding to the metadata access call, the second predetermined depth being greater than the first predetermined depth.

* * * * *